US012562431B2

(12) United States Patent
Jeong et al.

(10) Patent No.: US 12,562,431 B2
(45) Date of Patent: Feb. 24, 2026

(54) METHOD FOR MANUFACTURING SEPARATOR AND SEPARATOR MANUFACTURED THEREBY

(71) Applicant: LG ENERGY SOLUTION, LTD., Seoul (KR)

(72) Inventors: So-Mi Jeong, Daejeon (KR); Min-Ji Kim, Daejeon (KR); Chan-Jong Kim, Daejeon (KR); Da-Kyung Han, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 614 days.

(21) Appl. No.: 17/617,804

(22) PCT Filed: Jun. 11, 2020

(86) PCT No.: PCT/KR2020/007611
§ 371 (c)(1),
(2) Date: Dec. 9, 2021

(87) PCT Pub. No.: WO2020/251286
PCT Pub. Date: Dec. 17, 2020

(65) Prior Publication Data
US 2022/0247034 A1 Aug. 4, 2022

(30) Foreign Application Priority Data

Jun. 14, 2019 (KR) ........................ 10-2019-0070942

(51) Int. Cl.
*H01M 50/403* (2021.01)
*H01M 10/0525* (2010.01)
(Continued)

(52) U.S. Cl.
CPC ..... *H01M 50/403* (2021.01); *H01M 10/0525* (2013.01); *H01M 50/417* (2021.01);
(Continued)

(58) Field of Classification Search
CPC ........... H01M 50/403; H01M 10/0525; H01M 50/417; H01M 50/426; H01M 50/434;
(Continued)

(56) References Cited

U.S. PATENT DOCUMENTS

2006/0019169 A1* 1/2006 Smith ................. H01M 10/056
429/303
2011/0152443 A1* 6/2011 Ito ........................... G11C 11/22
524/545
(Continued)

FOREIGN PATENT DOCUMENTS

CN 105556702 A 5/2016
CN 107958977 A * 4/2018 ........ H01M 10/0525
(Continued)

OTHER PUBLICATIONS

Components 101, "Battery Separators—Types and Importance in the Performance of Battery", Nov. 25, 2019. https://components 101.com/articles/battery-seperators-types-and-importance (Year: 2019).*
(Continued)

*Primary Examiner* — Nicholas A Smith
*Assistant Examiner* — Zheng Lu
(74) *Attorney, Agent, or Firm* — Morgan, Lewis & Bockius LLP

(57) ABSTRACT

Disclosed are a method for manufacturing a separator and a separator obtained thereby. The method includes forming a porous coating layer by using slurry for forming a porous coating layer including inorganic particles, lithium halide and a polyvinylidene fluoride-based binder polymer. It is possible to provide a separator showing reduced resistance and an electrochemical device including the same by modifying the properties of the binder polymer.

13 Claims, 3 Drawing Sheets

(51) Int. Cl.

| | |
|---|---|
| *H01M 50/417* | (2021.01) |
| *H01M 50/426* | (2021.01) |
| *H01M 50/434* | (2021.01) |
| *H01M 50/443* | (2021.01) |
| *H01M 50/446* | (2021.01) |
| *H01M 50/449* | (2021.01) |
| *H01M 50/451* | (2021.01) |
| *H01M 50/457* | (2021.01) |

(52) U.S. Cl.
CPC ....... *H01M 50/426* (2021.01); *H01M 50/434* (2021.01); *H01M 50/443* (2021.01); *H01M 50/446* (2021.01); *H01M 50/449* (2021.01); *H01M 50/451* (2021.01); *H01M 50/457* (2021.01)

(58) Field of Classification Search
CPC ............. H01M 50/443; H01M 50/446; H01M 50/449; H01M 50/451; H01M 50/457
See application file for complete search history.

(56) References Cited

U.S. PATENT DOCUMENTS

| | | | |
|---|---|---|---|
| 2014/0272505 A1* | 9/2014 | Yoon ................... | H01M 50/417 429/94 |
| 2015/0263324 A1 | 9/2015 | Lee et al. | |
| 2016/0181626 A1* | 6/2016 | Madabusi .......... | H01M 8/0221 429/105 |
| 2016/0218340 A1 | 7/2016 | Ryu et al. | |
| 2016/0254511 A1 | 9/2016 | Hatta et al. | |
| 2018/0254449 A1 | 9/2018 | Xiao et al. | |
| 2018/0309104 A1* | 10/2018 | Shin ................... | H01M 50/417 |
| 2019/0131604 A1* | 5/2019 | Yoon ................... | H01M 50/403 |
| 2019/0173069 A1 | 6/2019 | Kwon et al. | |
| 2019/0245183 A1 | 8/2019 | Jeong et al. | |
| 2020/0203694 A1 | 6/2020 | Yun et al. | |

FOREIGN PATENT DOCUMENTS

| | | | | |
|---|---|---|---|---|
| CN | 109088034 A | * | 12/2018 | |
| KR | 10-2009-0030825 A | | 3/2009 | |
| KR | 10-2009-0030827 A | | 3/2009 | |
| KR | 10-2009-0079501 A | | 7/2009 | |
| KR | 10-1402976 B1 | | 6/2014 | |
| KR | 10-2015-0070979 A | | 6/2015 | |
| KR | 10-2016-0002173 A | | 1/2016 | |
| KR | 20180018408 A | * | 2/2018 | ........ H01M 10/0525 |
| KR | 10-2018-0023627 A | | 3/2018 | |
| KR | 10-1840136 B1 | | 3/2018 | |
| KR | 10-2019-0033028 A | | 3/2019 | |
| KR | 10-2019-0049604 A | | 5/2019 | |
| WO | 2017/107435 A1 | | 6/2017 | |
| WO | 2017/107436 A1 | | 6/2017 | |
| WO | 2018/147714 A1 | | 8/2018 | |
| WO | 2019/086034 A1 | | 5/2019 | |
| WO | 2019/112353 A1 | | 6/2019 | |

OTHER PUBLICATIONS

Ruan L, Yao X, Chang Y, Zhou L, Qin G, Zhang X. Properties and Applications of the β Phase Poly(vinylidene fluoride). Polymers (Basel). Feb. 26, 2018;10(3):228. doi: 10.3390/polym10030228. PMID: 30966263; PMCID: PMC6415445. (Year: 2018) .*

Techiescience, "Solubility of LiCl: A Comprehensive Guide to Lithium Chloride in Solution", Apr. 2, 2023. https://techiescience.com/solubility-of-licl/ (Year: 2023).*

Ribeiro et al., "Electroactive poly(vinylidene fluoride)-based structures for advanced applications," Nature Protocols, vol. 13, No. 4, 2018, p. 681-7044.

Kim et al., "Highly porous piezoelectric PVDF membrane as effective lithium ion transfer channels for enhanced self-charging power cell," Nano Energy, 2015, vol. 14, p. 77-86.

International Search Report (with partial translation) and Written Opinion issued in corresponding International Patent Application No. PCT/KR2020/007611, dated Sep. 17, 2020.

Extended European Search Report issued in corresponding European Patent Application No. 20821905.5 dated Nov. 17, 2022.

* cited by examiner

METHOD FOR MANUFACTURING SEPARATOR AND SEPARATOR MANUFACTURED THEREBY

TECHNICAL FIELD

The present disclosure relates to a separator applicable to an electrochemical device, such as a lithium secondary battery, and an electrochemical device including the same.

The present application claims priority to Korean Patent Application No. 10-2019-0070942 filed on Jun. 14, 2019 in the Republic of Korea, the disclosures of which are incorporated herein by reference.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles.

In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni–MH, Ni–Cd and sulfuric acid-lead batteries using an aqueous electrolyte.

Although such electrochemical devices, such as lithium secondary batteries, have been produced from many production companies, safety characteristics thereof show different signs. Evaluation and securement of safety of such electrochemical devices are very important. The most important consideration is that electrochemical devices should not damage users upon their malfunction. For this purpose, safety standards strictly control ignition and smoke emission in electrochemical devices. With regard to safety characteristics of electrochemical devices, there is great concern about explosion when an electrochemical device is overheated to cause thermal runaway or perforation of a separator. Particularly, a polyolefin-based porous substrate used conventionally as a separator for an electrochemical device shows a severe heat shrinking behavior at a temperature of 100° C. or higher due to its material property and a characteristic during its manufacturing process, including orientation, thereby causing a short-circuit between a cathode and an anode.

To solve the above-mentioned safety problems of an electrochemical device, there has been suggested a separator having a porous coating layer formed by coating a mixture of inorganic particles with a binder polymer onto at least one surface of a porous polymer substrate having a plurality of pores.

DISCLOSURE

Technical Problem

The present disclosure is designed to solve the problems of the related art, and therefore the present disclosure is directed to providing a method for manufacturing a separator having reduced resistance and improved physical properties.

The present disclosure is also directed to providing an electrochemical device provided with a separator obtained by the method.

Technical Solution

In one aspect of the present disclosure, there is provided a method for manufacturing a free-standing separator according to any one of the following embodiments.

According to the first embodiment of the present disclosure, there is provided a method for manufacturing a free-standing separator, including the steps of:

(S10) preparing slurry for forming an organic-inorganic separator layer including inorganic particles, lithium halide and a polyvinylidene fluoride-based binder polymer;

(S20) applying the slurry for forming an organic-inorganic separator layer to a release film, followed by drying, to form a porous separator layer; and (S30) removing the release film.

According to the second embodiment of the present disclosure, there is provided the method for manufacturing a free-standing separator as defined in the first embodiment, wherein the lithium halide includes lithium fluoride (LiF), lithium chloride (LiCl), lithium bromide (LiBr), lithium iodide (LiI), or two or more of them.

According to the third embodiment of the present disclosure, there is provided the method for manufacturing a free-standing separator as defined in the first or the second embodiment, wherein the lithium halide is used in an amount of 2-20 parts by weight based on 100 parts by weight of the polyvinylidene fluoride-based binder polymer.

According to the fourth embodiment of the present disclosure, there is provided the method for manufacturing a free-standing separator as defined in any one of the first to the third embodiments, wherein the polyvinylidene fluoride-based binder polymer includes: (a) polyvinylidene fluoride-based homopolymer; (b) copolymer of polyvinylidene fluoride with any one of hexafluoropropylene (HFP), trifluoroethylene (TrFE), tetrafluoroethylene (TFE) and chlorotrifluoroethylene (CTFE); or two or more of them.

According to the fifth embodiment of the present disclosure, there is provided the method for manufacturing a free-standing separator as defined in any one of the first to the fourth embodiments, wherein the content of β-phase of the polyvinylidene fluoride-based binder polymer in the porous separator layer of step (S20) is increased by 50% or more based on the content of β-phase of the polyvinylidene fluoride-based binder polymer in the slurry of step (S10).

According to the sixth embodiment of the present disclosure, there is provided the method for manufacturing a free-standing separator as defined in any one of the first to the fifth embodiments, which further includes a step of washing the product of step (S20) with water between step (S20) and step (S30).

According to the seventh embodiment of the present disclosure, there is provided the method for manufacturing a free-standing separator as defined in the sixth embodiment, wherein the washing step is a step of removing the lithium halide.

In another aspect of the present disclosure, there is provided a method for manufacturing a separator for an electrochemical device according to any one of the following embodiments.

According to the eighth embodiment, there is provided a method for manufacturing a separator for an electrochemical device, including the steps of:

(S11) preparing slurry for forming a porous coating layer including inorganic particles, lithium halide and a polyvinylidene fluoride-based binder polymer; and (S21) applying the slurry for forming a porous coating layer to at least one surface of a porous polymer substrate, followed by drying, to form a porous coating layer coated on the porous polymer substrate.

According to the ninth embodiment of the present disclosure, there is provided the method for manufacturing a separator for an electrochemical device as defined in the eighth embodiment, wherein the lithium halide includes lithium fluoride (LiF), lithium chloride (LiCl), lithium bromide (LiBr), lithium iodide (LiI), or two or more of them.

According to the tenth embodiment of the present disclosure, there is provided the method for manufacturing a separator for an electrochemical device as defined in the eighth or the ninth embodiment, wherein the lithium halide is used in an amount of 2-20 parts by weight based on 100 parts by weight of the polyvinylidene fluoride-based binder polymer.

According to the eleventh embodiment of the present disclosure, there is provided the method for manufacturing a separator for an electrochemical device as defined in any one of the eighth to the tenth embodiments, wherein the polyvinylidene fluoride-based binder polymer includes: (a) polyvinylidene fluoride-based homopolymer; (b) copolymer of polyvinylidene fluoride with any one of hexafluoropropylene (HFP), trifluoroethylene (TrFE), tetrafluoroethylene (TFE) and chlorotrifluoroethylene (CTFE); or two or more of them.

According to the twelfth embodiment of the present disclosure, there is provided the method for manufacturing a separator for an electrochemical device as defined in any one of the eighth to the eleventh embodiments, wherein the content of β-phase of the polyvinylidene fluoride-based binder polymer in the porous coating layer of step (S21) is increased by 50% or more based on the content of β-phase of the polyvinylidene fluoride-based binder polymer in the slurry of step (S11).

According to the thirteenth embodiment of the present disclosure, there is provided the method for manufacturing a separator for an electrochemical device as defined in any one of the eighth to the twelfth embodiments, wherein step (S21) is a step of applying the slurry for forming a porous coating layer to at least one surface of the porous polymer substrate, and dipping the coated porous polymer substrate in a non-solvent.

According to the fourteenth embodiment of the present disclosure, there is provided the method for manufacturing a separator for an electrochemical device as defined in the thirteenth embodiment, wherein step (S21) is a step of forming a porous coating layer and removing the lithium halide at the same time.

In still another aspect of the present disclosure, there is provided an electrochemical device according to any one of the following embodiments.

According to the fifteenth embodiment of the present disclosure, there is provided an electrochemical device including a cathode, an anode and a separator interposed between the cathode and the anode, wherein the separator is a separator obtained by the method as defined in any one of the first to the fourteenth embodiments.

According to the sixteenth embodiment of the present disclosure, there is provided the electrochemical device as defined in the fifteenth embodiment, which is a lithium secondary battery.

Advantageous Effects

According to an embodiment of the present disclosure, it is possible to provide a free-standing separator which uses no porous polymer substrate, and thus has a smaller thickness. In addition, according to an embodiment of the present disclosure, it is possible to improve physical properties of a binder polymer by virtue of the use of lithium halide. Therefore, it is possible to provide a method for manufacturing a separator showing lower resistance as compared to the conventional separator and suitable for use in a separator for an electrochemical device. As a result, it is possible to provide a separator showing low resistance and an electrochemical device having improved output characteristics.

According to another embodiment of the present disclosure, it is possible to provide a separator which uses a porous polymer substrate and thus has excellent mechanical strength, and to improve physical properties of a binder polymer by virtue of the use of lithium halide. Therefore, it is possible to provide a method for manufacturing a separator showing lower resistance as compared to the conventional separator and suitable for use in a separator for an electrochemical device.

BEST MODE

Figure 1:
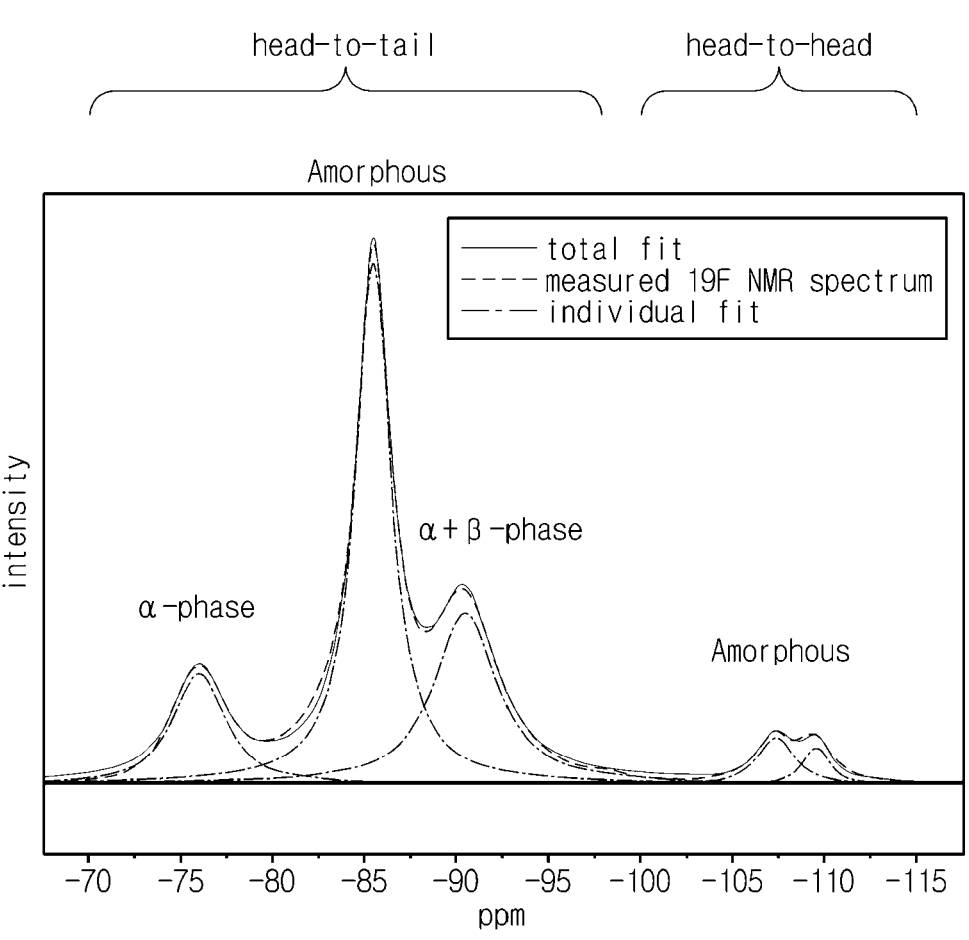
FIG. 1 is a graph illustrating the crystalline phase and amorphous phase of a PVDF film itself.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

As used herein, the expression 'one portion is connected to another portion' covers not only 'a portion is directly connected to another portion' but also 'one portion is connected indirectly to another portion' by way of the other element interposed between them. In addition, 'connection' covers electrochemical connection as well as physical connection.

Throughout the specification, the expression 'a part [includes] an element' does not preclude the presence of any additional elements but means that the part may further include the other elements.

In addition, it will be understood that the terms "comprises" and/or "comprising", or "includes" and/or "including" when used in this specification, refer to the presence of any stated shapes, numbers, steps, operations, members, elements and/or groups thereof, but do not preclude the addition of one or more other shapes, numbers, steps, operations, members, elements and/or groups thereof.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

Hereinafter, the present disclosure will be explained in more detail.

In an electrochemical device, such as a lithium secondary battery, a separator generally uses a porous polymer substrate, and thus has a problem in that it shows a heat shrinking behavior. Therefore, an organic-inorganic porous coating layer has been introduced in order to reduce the heat shrinkage of the separator.

However, a binder polymer used in such an organic-inorganic porous coating layer functions as resistance, and thus the properties of the binder polymer significantly affects improvement of the output characteristics of a battery.

The present inventors have focused on the above-mentioned problem and have conducted many studies to improve the physical properties of a binder polymer. Thus, the present disclosure is directed to providing a method for manufacturing a separator which has low resistance and can improve the output of a battery, and a separator obtained by the method.

To solve the above-mentioned problem, there is provided a method for manufacturing a free-standing separator, including the steps of:

(S10) preparing slurry for forming an organic-inorganic separator layer including inorganic particles, lithium halide and a polyvinylidene fluoride-based binder polymer;

(S20) applying the slurry for forming an organic-inorganic separator layer to a release film, followed by drying, to form a porous separator layer; and (S30) removing the release film.

In the method for manufacturing a separator according to an embodiment of the present disclosure, the slurry for forming an organic-inorganic porous separator layer includes lithium halide.

The lithium halide may include a lithium cation and halogen anion ($F^-$, $Cl^-$, $Br^-$, $I^-$). Particularly, the lithium halide may include lithium fluoride (LiF), lithium chloride (LiCl), lithium bromide (LiBr), lithium iodide (LiI), or two or more of them.

When the slurry for forming an organic-inorganic porous coating layer merely includes a fluoride-based binder polymer and inorganic particles according to the related art, the fluoride-based binder polymer functions as resistance to cause degradation of the output characteristics of a battery undesirably. When reducing the content of the fluoride-based binder polymer in order to reduce the resistance of a separator, there is a problem in that the mechanical properties and adhesion of the separator are degraded.

The present inventors have found that when using a polyvinylidene fluoride-based binder polymer in combination with lithium halide, α-phase in the polyvinylidene fluoride-based binder polymer is converted into β-phase to form a local electric field, and thus lithium ions can be transported rapidly in the separator. Particularly, in the case of lithium halide, it can increase the lithium cation content in the porous separator layer to provide an advantage in that the output of an electrochemical device can be improved.

The content of the lithium halide may be 2-20 parts by weight, or 5-15 parts by weight, based on 100 parts by weight of the polyvinylidene fluoride-based binder polymer. Within the above-defined range, lithium halide can increase the content of β-phase in the binder polymer in the porous separator layer. At the same time, the lithium cation content in the porous separator layer can be increased so that the capacity of an electrochemical device including the free-standing separator may be increased. In addition, a local electric field through which lithium ions can pass may be formed suitably within the above-defined range.

The lithium halide is removed, after the content of β-phase in the binder polymer in the porous separator layer is increased. In this context, LiCl having higher solubility to water is more advantageous as compared to LiF having lower solubility to water.

In the method for manufacturing a free-standing separator according to an embodiment of the present disclosure, the slurry for forming an organic-inorganic porous separator layer includes a polyvinylidene fluoride-based binder polymer.

The polyvinylidene fluoride-based binder polymer is an adhesive binder polymer which fixes and interconnects the inorganic particles.

For example, the polyvinylidene fluoride-based binder polymer may include: (a) polyvinylidene fluoride-based homopolymer; (b) copolymer of polyvinylidene fluoride with any one of hexafluoropropylene (HFP), trifluoroethylene (TrFE), tetrafluoroethylene (TFE) and chlorotrifluoroethylene (CTFE); or two or more of them.

According to an embodiment of the present disclosure, the slurry includes the polyvinylidene fluoride-based binder polymer in combination with lithium halide. Therefore, it is possible to convert the physical properties of the polyvinylidene fluoride-based binder polymer and to provide a free-standing separator showing low resistance and excellent adhesion to an electrode. Particularly, since the free-standing separator according to an embodiment of the present disclosure is free from a porous polymer substrate, it is possible to fundamentally prevent a problem of a short-circuit generated between a negative electrode and a positive electrode due to the heat shrinking of the porous polymer substrate.

In the method for manufacturing a free-standing separator according to an embodiment of the present disclosure, the slurry for forming an organic-inorganic separator layer may include inorganic particles.

There is no particular limitation in the inorganic particles, as long as they are electrochemically stable. In other words, there is no particular limitation in the inorganic particles that may be used herein, as long as they cause no oxidation and/or reduction in the range (e.g. 0-5V based on $Li/Li^+$) of operating voltage of an applicable electrochemical device. Particularly, when using inorganic particles having a high dielectric constant as the inorganic particles, it is possible to improve the ion conductivity of an electrolyte by increasing the dissociation degree of an electrolyte salt, such as a lithium salt, in a liquid electrolyte.

For the above-mentioned reasons, the inorganic particles may include inorganic particles having a dielectric constant of 5 or more, inorganic particles having lithium ion transportability, and a mixture thereof.

The inorganic particles having a dielectric constant of 5 or more may include any one selected from the group consisting of $Al_2O_3$, $SiO_2$, $ZrO_2$, $AlOOOH$, $TiO_2$, $BaTiO_3$, $Pb(ZrxTi1-x)O_3$ (PZT, wherein $0 < x < 1$), $Pb_{1-x}La_xZr_{1-y}Ti_yO_3$ (PLZT, wherein $0 < x < 1$, $0 < y < 1$), $(1-x)Pb(Mg_{1/3}Nb_{2/3})O_3$-$xPbTiO_3$ (PMN-PT, wherein $0 < x < 1$), hafnia ($HfO_2$), $SrTiO_3$, $SnO_2$, $CeO_2$, $MgO$, $NiO$, $CaO$, $ZnO$ and $SiC$, or a mixture of two or more of them.

The inorganic particles having lithium ion transportability may be any one selected from the group consisting of include lithium phosphate ($Li_3PO_4$), lithium titanium phosphate ($Li_xTi_y(PO_4)_3$, $0 < x < 2$, $0 < y < 3$), lithium aluminum titanium phosphate ($Li_xAl_yTi_z(PO_4)_3$, $0 < x < 2$, $0 < y < 1$, $0 < z < 3$), $(LiAlTiP)_xO_y$-based glass ($0 < x < 4$, $0 < y < 13$), lithium lanthanum titanate ($Li_xLa_yTiO_3$, $0 < x < 2$, $0 < y < 3$), lithium germanium thiophosphate ($Li_xGe_yP_zS_w$, $0 < x < 4$, $0 < y < 1$, $0 < z < 1$, $0 < w < 5$), lithium nitride ($Li_xN_y$, $0 < x < 4$, $0 < y < 2$), $SiS_2$-based glass ($Li_xSi_yS_z$, $0 < x < 3$, $0 < y < 2$, $0 < z < 4$) and $P_2S_5$-based glass ($Li_xP_yS_z$, $0 < x < 3$, $0 < y < 3$, $0 < z < 7$), or a mixture of two or more of them.

In addition, there is no particular limitation in the average particle diameter of the inorganic particles. However, the inorganic particles preferably have an average particle diameter of 0.001-10 μm, preferably 1-700 nm, and more preferably 20-500 nm, with a view to formation of a coating layer with a uniform thickness and suitable porosity.

According to an embodiment of the present disclosure, the weight ratio of the inorganic particles to the polyvinylidene fluoride-based binder polymer may be 90:10-60:40. When the weight ratio of the inorganic particles to the polyvinylidene fluoride-based binder polymer satisfies the above-defined range, it is possible to prevent the problem of a decrease in pore size and porosity of the resultant porous separator layer, caused by an increase in content of the binder polymer. It is also possible to solve the problem of degradation of peeling resistance of the resultant porous separator layer, caused by a decrease in content of the binder polymer.

In addition, the slurry for forming a porous separator layer may further comprise a binder polymer having adhesive property and used conventionally in the art, besides the above-described polyvinylidene fluoride-based binder polymer.

In the method for manufacturing a free-standing separator according to an embodiment of the present disclosure, the porous separator layer may further include other additives as ingredients thereof, besides the above-described inorganic particles and binder polymer.

In the method for manufacturing a free-standing separator according to an embodiment of the present disclosure, the slurry for forming a porous separator layer may be prepared by introducing the inorganic particles to a solvent, and then further introducing the binder polymer and lithium halide thereto.

In a variant, the inorganic particles and lithium halide may be further introduced to a binder polymer composition containing the binder polymer dissolved or dispersed therein. However, the method is not limited thereto, as long as the inorganic particles and lithium halide can be dispersed homogeneously.

Herein, non-limiting examples of the solvent that may be used include acetone, tetrahydrofuran, methylene chloride, chloroform, dimethyl formamide, N-methyl-2-pyrrolidone (NMP), cyclohexane, water or a mixture thereof.

Next, the prepared slurry for forming a porous separator layer is applied to a release film, followed by drying, to form a porous separator layer (S20).

The release film is made of any material from which the porous separator layer coated on one surface thereof is released with ease subsequently. Non-limiting examples of the release film include a polyester film, such as polyethylene terephthalate, polypropylene film, glass, or the like. To further improve release property, the release film may be coated with a silicon-containing compound.

The thickness of the release film is not particularly limited, but may be 0.5-100 μm, or 20-50 μm.

The method for applying the slurry for forming a porous separator layer on the release film may be any coating method known to those skilled in the art. For example, various processes, including bar coating, dip coating, die coating, roll coating, comma coating or a combination thereof, may be used.

Then, the release film may be removed to obtain a free-standing separator including a porous separator layer (S30).

Although here is no particular limitation in the thickness of the porous separator layer, the thickness may be 1-30 μm, more particularly 5-18 μm. Also, the porosity of the porous separator layer is not particularly limited, but it may be preferably 35-85%.

According to an embodiment of the present disclosure, the content of β-phase of the polyvinylidene fluoride-based binder polymer in the porous separator layer of step (S20) may be increased by 50% or more based on the content of β-phase of the polyvinylidene fluoride-based binder polymer in the slurry of step (S10). Therefore, it is possible to provide an electrochemical device which shows low resistance by virtue of such an increased content of β-phase in the polyvinylidene fluoride-based binder polymer and has improved capacity by virtue of the incorporation of lithium cations.

The obtained free-standing separator is free from a porous polymer substrate, and thus can fundamentally solve the safety problem caused by heat shrinking. In addition, an effect of flame resistance can be expected. This is because no inflammable porous polymer substrate is used.

Herein, the method may further include a step of washing the product of step (S20) with water between step (S20) and step (S30). The washing step may be a step of removing the lithium halide. It is possible to prevent any side reaction with the separator layer that may occur subsequently by removing the used lithium halide as mentioned above.

In another aspect, there is provided a method for manufacturing a separator for an electrochemical device, including the steps of:

(S11) preparing slurry for forming a porous coating layer including inorganic particles, lithium halide and a polyvinylidene fluoride-based binder polymer; and (S21) applying the slurry for forming a porous coating layer to at least one surface of a porous polymer substrate, followed by drying, to form a porous coating layer coated on the porous polymer substrate.

The separator obtained by the method includes the porous polymer substrate as a support of the separator.

Particularly, the porous polymer substrate may be a porous polymer film substrate or porous polymer nonwoven web substrate.

The porous polymer film substrate may be a porous polymer film including polyolefin, such as polyethylene or polypropylene. For example, such a polyolefin porous polymer film substrate may realize a shut-down function at a temperature of 80-150° C.

Herein, the polyolefin porous polymer film may be formed of polymers including polyolefin polymers, such as polyethylene, including high-density polyethylene, linear low-density polyethylene, low-density polyethylene or ultrahigh-molecular weight polyethylene, polypropylene, polybutylene, or polypentene, alone or in combination of two or more of them.

In addition, the porous polymer film substrate may be obtained by molding various polymers, such as polyesters, other than polyolefins, into a film shape. Further, the porous polymer film substrate may have a stacked structure of two or more film layers, wherein each film layer may be formed of polymers including the above-mentioned polymers, such as polyolefins or polyesters, alone or in combination of two or more of them.

In addition, the porous polymer film substrate and porous nonwoven web substrate may be formed of polyethylene terephthalate, polybutylene terephthalate, polyester, polyacetal, polyamide, polycarbonate, polyimide, polyetherether ketone, polyether sulfone, polyphenylene oxide, polyphenylene sulfide, or polyethylene naphthalene, alone or in combination, besides the above-mentioned polyolefins.

In addition, there is no particular limitation in the thickness of the porous polymer substrate, the porous polymer substrate has a thickness of 1-100 μm, particularly 5-50 μm. Although there is no particular limitation in the size of the pores present in the porous polymer substrate and porosity, the pore size and porosity may be 0.01-50 μm and 20-75%, respectively.

It is possible to insulate a cathode and an anode physically from each other by incorporating such a porous polymer substrate. In this case, the separator shows improved insulation property as compared to a free-standing separator and has a shut-down function advantageously.

Meanwhile, reference will be made to the above description about the inorganic particles, lithium halide, polyvinylidene fluoride-based binder polymer and the solvent.

According to an embodiment of the present disclosure, when manufacturing a separator for an electrochemical device, the content of lithium halide may be 2-20 parts by weight, or 5-15 parts by weight, based on 100 parts by weight of the polyvinylidene fluoride-based binder polymer. Within the above-defined range, lithium halide can increase the content of β-phase in the binder polymer in the porous coating layer. At the same time, the lithium cation content in the porous coating layer can be increased so that the capacity of an electrochemical device including the porous polymer substrate and the separator may be increased. In addition, a local electric field through which lithium ions can pass may be formed suitably within the above-defined range.

According to an embodiment of the present disclosure, the content of β-phase of the polyvinylidene fluoride-based binder polymer in the porous coating layer of step (S21) may be increased by 50% or more based on the content of β-phase of the polyvinylidene fluoride-based binder polymer in the slurry of step (S11). Therefore, it is possible to provide an electrochemical device which shows improved output characteristics and reduced resistance by virtue of an increased content of β-phase in the polyvinylidene fluoride-based binder polymer and an increased content of lithium derived from the introduction of lithium halide.

Meanwhile, in the method for manufacturing a separator for an electrochemical device including a porous polymer substrate, the pores in the porous coating layer may be formed by the following method.

For example, the slurry for forming a porous coating layer may be applied to at least one surface of the porous polymer substrate. Herein, the slurry may be applied by using a coating process used currently in the art, such as Meyer bar coating, die coating, reverse roll coating or gravure coating. When the porous coating layer is formed on both surfaces of the porous polymer substrate, the coating solution may be applied to one surface and the other surface sequentially, and then solidification, washing with water and drying may be carried out. However, it is preferred in terms of productivity that the coating solution is applied onto both surfaces of the porous polymer substrate at the same time, and then solidification, washing with water and drying are carried out.

According to the present disclosure, the solvent used for the slurry for forming a porous coating layer is one capable of dissolving the polyvinylidene fluoride-based binder polymer, particularly dissolving 7 wt % or more of the polyvinylidene fluoride-based binder polymer at 60° C.

According to an embodiment of the present disclosure, the solvent may include at least one selected from N-methyl-2-pyrrolidone, dimethyl acetamide and dimethyl formamide.

Then, the porous polymer substrate coated with the slurry for forming a porous coating layer may be dipped in a non-solvent to the polyvinylidene fluoride-based binder polymer.

Herein, 'non-solvent' means one in which less than 3 wt % of the polyvinylidene fluoride-based binder polymer is dissolved at 60° C., or less than 1 wt % of the polyvinylidene fluoride-based binder polymer is dissolved at room temperature. In other words, the non-solvent means a solvent in which the polyvinylidene fluoride-based binder polymer is not dissolved, and is not particularly limited as long as it is a liquid miscible with the solvent used to facilitate phase separation.

According to an embodiment of the present disclosure, the non-solvent may include at least one selected from water, methanol, ethanol, propyl alcohol, butyl alcohol, butanediol, ethylene glycol, propylene glycol and tripropylene glycol. Preferably, the non-solvent may be water.

Herein, pores may be formed in the porous coating layer by the non-solvent.

Then, the resultant product may be dried in an oven to provide a separator having a porous coating layer.

As described above, the porous coating layer may be formed through dipping phase separation. Through the dipping phase separation, pores may be formed in the porous coating layer by the mass exchange interaction between the solvent in the slurry and the non-solvent.

While the porous coating layer is formed by dipping phase separation as described above, lithium halide may be removed at the same time. It is possible to prevent any side reaction with the separator that may occur subsequently by removing the lithium halide used herein. Therefore, there is provided high processing and time efficiency.

According to another embodiment of the present disclosure, the pores may be formed in the porous coating layer by the following method.

For example, slurry for forming a porous coating layer, including inorganic particles, lithium halide and a polyvinylidene fluoride-based binder polymer, may be applied to a porous polymer substrate, followed by drying, to form a porous coating layer.

Herein, the solvent preferably has a solubility parameter similar to the solubility parameter of the binder polymer to be used and has a low boiling point, in order to facilitate the uniform mixing and subsequent removal of the solvent. Non-limiting examples of the solvent that may be used include any one selected from water, acetone, tetrahydrofuran, methylene chloride, chloroform, dimethyl formamide, N-methyl-2-pyrrolidone, methyl ethyl ketone and cyclohexane, or a mixture of two or more of them.

Although there is no particular limitation in the process for coating the slurry for forming a porous coating layer onto the porous polymer substrate, it is preferred to use a slot coating or dip coating process. A slot coating process includes coating a composition supplied through a slot die onto the whole surface of a substrate and is capable of controlling the thickness of a coating layer depending on the flux supplied from a metering pump. In addition, dip coating includes dipping a substrate into a tank containing a composition to carry out coating and is capable of controlling the thickness of a coating layer depending on the concentration of the composition and the rate of removing the substrate from the composition tank. Further, in order to control the coating thickness more precisely, it is possible to carry out post-metering through a Mayer bar or the like, after dipping.

Then, the porous polymer substrate coated with the slurry for forming a porous coating layer is dried by using a dryer, such as an oven, thereby forming a porous coating layer on at least one surface of the porous polymer substrate.

Herein, the coated porous polymer substrate may be dried in a drying chamber, wherein the condition of the drying chamber is not particularly limited.

However, in this case, since drying is carried out under a humidified condition, the polyvinylidene fluoride-based binder polymer may be distributed largely on the surface of the porous coating layer.

The drying step may be carried out under a relative humidity of 40% or more, such as 35-65%.

In addition, the drying step may be carried out at a temperature ranging from 20° C. to 70° C. for 0.1-2 minutes.

In the porous coating layer formed under such a humidified condition, the inorganic particles are bound among themselves by the binder polymer while they are packed and are in contact with one another. Thus, interstitial volumes may be formed among the inorganic particles and the interstitial volumes may become vacant spaces to form pores.

In other words, the binder polymer attaches the inorganic particles to each other so that they may retain their binding states. For example, the binder polymer connects and fixes the inorganic particles with one another. In addition, the pores in the porous coating layer are those formed by the interstitial volumes among the inorganic particles which become vacant spaces. The spaces may be defined by the inorganic particles facing each other substantially in a closely packed or densely packed structure of the inorganic particles.

In still another aspect of the present disclosure, there is provided an electrochemical device including a cathode, an anode and a separator interposed between the cathode and the anode, wherein the separator is the above-described separator according to an embodiment of the present disclosure.

The electrochemical device includes any device which carries out electrochemical reaction, and particular examples thereof include all types of primary batteries, secondary batteries, fuel cells, solar cells or capacitors, such as super capacitor devices. Particularly, among the secondary batteries, lithium secondary batteries, including lithium metal secondary batteries, lithium ion secondary batteries, lithium polymer secondary batteries or lithium ion polymer batteries, are preferred.

The two electrodes, cathode and anode, used in combination with the separator according to the present disclosure are not particularly limited, and may be obtained by allowing electrode active materials to be bound to an electrode current collector through a method generally known in the art. Among the electrode active materials, non-limiting examples of a cathode active material include conventional cathode active materials that may be used for the cathodes for conventional electrochemical devices. Particularly, lithium manganese oxides, lithium cobalt oxides, lithium nickel oxides, lithium iron oxides or lithium composite oxides containing a combination thereof are used preferably. Non-limiting examples of an anode active material include conventional anode active materials that may be used for the anodes for conventional electrochemical devices. Particularly, lithium-intercalating materials, such as lithium metal or lithium alloys, carbon, petroleum coke, activated carbon, graphite or other carbonaceous materials, are used preferably. Non-limiting examples of a cathode current collector include foil made of aluminum, nickel or a combination thereof. Non-limiting examples of an anode current collector include foil made of copper, gold, nickel, copper alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

Magnesium oxide (MgO) as inorganic particles (particle size: 50 nm) were introduced to N-methyl-2-pyrrolidone as a solvent and dispersed therein at room temperature for about 2 hours to prepare a dispersion. Then, polyvinylidene fluoride homopolymer (PVDF, weight average molecular weight: 1,000,000) as a binder polymer and lithium chloride (LiCl) particles as lithium halide were introduced to the dispersion and mixing was carried out at 1500 rpm for 1 hour. Herein, the weight ratio of the binder polymer:inorganic particles were controlled to 25:75. Meanwhile, lithium halide was introduced in an amount of 10 parts by weight based on 100 parts by weight of the polyvinylidene fluoride-based binder polymer. The solid content in the finished slurry for forming a porous separator layer (slurry free from the solvent) was 15%.

The obtained slurry for forming a porous separator layer was coated on one surface of glass as a release film through a bar coating process and then dried at 150° C. in an oven.

The dried product was washed with water and the release film was removed. During the washing with water, lithium halide was removed. In this manner, a free-standing separator having a thickness of 10.2 μm was obtained.

Example 2

Alumina ($Al_2O_3$) as inorganic particles (particle size: 500 nm) were introduced to N-methyl-2-pyrrolidone as a solvent and dispersed therein at room temperature for about 2 hours to prepare a dispersion. Then, polyvinylidene fluoride-hexafluoropropylene copolymer (PVDF-HFP, weight average molecular weight 500,000, HFP content 15 wt %) as a binder polymer and lithium chloride particles as lithium halide were introduced to the dispersion and mixing was carried out at 1500 rpm for 1 hour. Herein, the weight ratio of the binder polymer:inorganic particles were controlled to 40:60. Meanwhile, lithium halide was introduced in an amount of 10 parts by weight based on 100 parts by weight of the polyvinylidene fluoride-based binder polymer. The solid content in the finished slurry for forming a porous coating layer was 20%.

The obtained slurry for forming a porous coating layer was coated on one surface of a porous polymer substrate (porosity: 45%) made of polypropylene and having a thickness of 16 μm through a bar coating process.

Then, the coated porous polymer substrate was dipped in water as a non-solvent for 30 seconds to form pores, and then dried at 150° C. in an oven.

In this manner, a separator for an electrochemical device having a thickness of 19.4 μm was obtained.

Example 3

Alumina ($Al_2O_3$) as inorganic particles (particle size: 500 nm) and a dispersant were introduced to acetone as a solvent and dispersed therein at 50° C. for about 2 hours to prepare a dispersion. Then, polyvinylidene fluoride-hexafluoropropylene copolymer (PVDF-HFP, weight average molecular weight 500,000, HFP content 15 wt %) as a binder polymer and lithium chloride particles as lithium halide were introduced to the dispersion and mixing was carried out at 1500 rpm for 1 hour. Herein, the weight ratio of the binder polymer:inorganic particles were controlled to 20:80. In addition, a dispersant was introduced in an amount of 2 parts by weight based on 100 parts by weight of the inorganic particle. Meanwhile, lithium halide was introduced in an amount of 10 parts by weight based on 100 parts by weight of the binder polymer. The solid content in the finished slurry for forming a porous coating layer was 20%.

The obtained slurry for forming a porous coating layer was coated on both surfaces of a porous substrate (Toray, porosity: 43%) made of polyethylene and having a thickness of 9 μm through a dip coating process under the conditions of a temperature of 23° C. and a relative humidity of 42%, and then dried to obtain a separator including porous coating layers and having a thickness of 17.7 μm.

Comparative Example 1

A free-standing separator was obtained in the same manner as Example 1, except that no lithium halide was introduced when preparing the slurry for forming a porous separator layer.

Comparative Example 2

A separator was obtained in the same manner as Example 2, except that no lithium halide was introduced when preparing the slurry for forming a porous coating layer.

Comparative Example 3

A separator was obtained in the same manner as Example 3, except that no lithium halide was introduced when preparing the slurry for forming a porous coating layer.

Test Examples (1) The thickness, air permeability, resistance and mono-cell resistance of each of the separators according to Comparative Examples 1-3 and Examples 1-3 are shown in the following Table 1.

TABLE 1

|  | Comp. Ex. 1 | Ex. 1 | Comp. Ex. 2 | Ex. 2 | Comp. Ex. 3 | Ex. 3 |
|---|---|---|---|---|---|---|
| Porous polymer substrate | — | — | Thickness: 16 μm Porosity: 45% Polypropylene | Thickness: 16 μm Porosity: 45% Polypropylene | Thickness: 9 μm Porosity: 43% Polyethylene | Thickness: 9 μm Porosity: 43% Polyethylenene |
| Thickness of separator (μm) | 10.5 | 10.2 | 19.7 | 19.4 | 17.3 | 17.7 |
| Air permeability (sec/100 mL) | 352 | 335 | 207 | 201 | 256 | 249 |
| Resistance of separator (ohm) | 1.11 | 0.76 | 0.79 | 0.58 | 1.16 | 0.80 |
| Mono-cell resistance (ohm) | 1.31 | 1.20 | 1.23 | 1.12 | 1.41 | 1.28 |

15

16

1) Method for Measuring Thickness

The thickness of each separator was measured by using a thickness gauge (Mitutoyo, VL-50S-B).

2) Method for Measuring Air Permeability

The air permeability was determined by using a Gurley type air permeability tester according to JIS P-8117. Herein, the time required for 100 mL of air to pass through a diameter of 28.6 mm and an area of 645 mm² was measured.

3) Determination of Resistance of Separator

Each of the separators according to Examples 1-3 and Comparative Examples 1-3 was impregnated with an electrolyte and the resistance was measured. The resistance was determined by using 1M LiPF₆-ethylene carbonate/ethyl methyl carbonate (weight ratio 3:7) as an electrolyte at 25° C. through an alternate current process.

4) Determination of Cell Resistance

To determine the cell resistance, a mono-cell was manufactured as follows.

First, anode slurry was prepared by mixing artificial graphite, carbon black, carboxymethyl cellulose (CMC) and styrene butadiene rubber with water at a weight ratio of 96:1:2:2. The anode slurry was coated on copper (Cu) foil at a capacity of 3.5 mAh/cm² to form a thin electrode plate and dried at 135° C. for 3 hours or more, followed by pressing. In this manner, an anode was obtained.

Next, LiNi₀.₆Co₀.₂Mn₀.₂O₂ as a cathode active material, carbon black and polyvinylidene fluoride (PVDF) were introduced to N-methyl-2-pyrrolidone (NMP) at a weight ratio of 96:2:2, followed by mixing, to prepare cathode slurry. The cathode slurry was coated on aluminum foil (thickness 20 μm) as a cathode current collector at a capacity of 3.3 mAh/cm² to obtain a cathode.

Then, each of the separators according to Examples and Comparative Examples was interposed between the cathode and the anode to obtain a mono-cell.

The mono-cell was used and discharged at 2.5 C rate at room temperature for 10 seconds to determine the pulse resistance.

Figure 2:
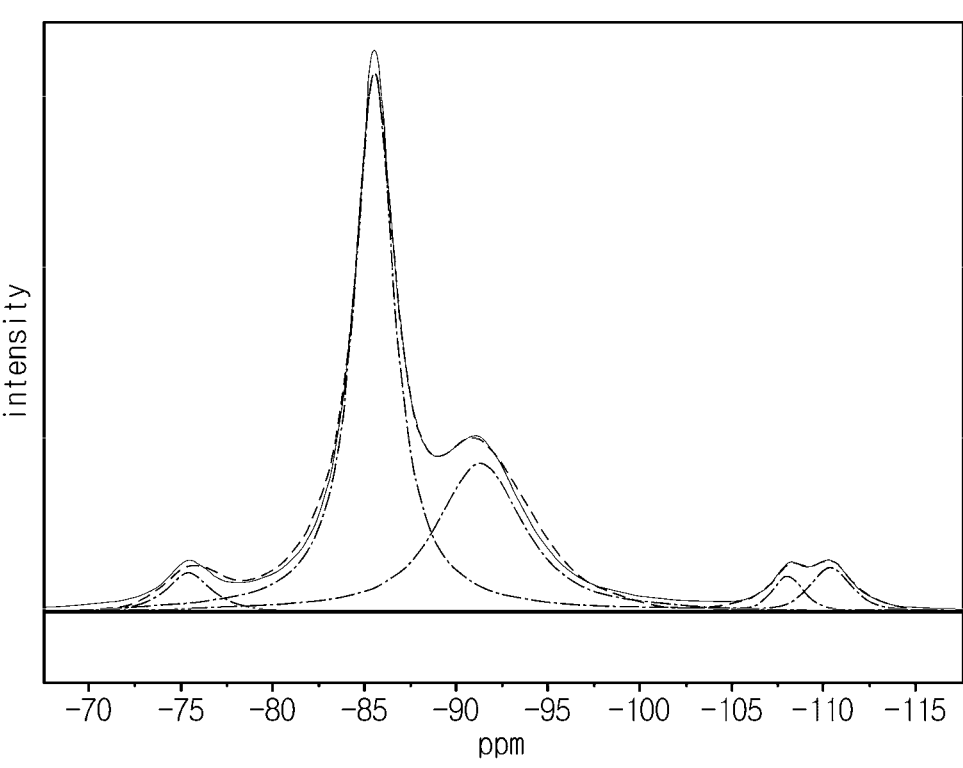
FIG. 2 and FIG. 3 are graphs illustrating the crystalline phase and amorphous phase of the separator according to Comparative Example 1 and those of the separator according to Example 1, respectively.
Figure 3:
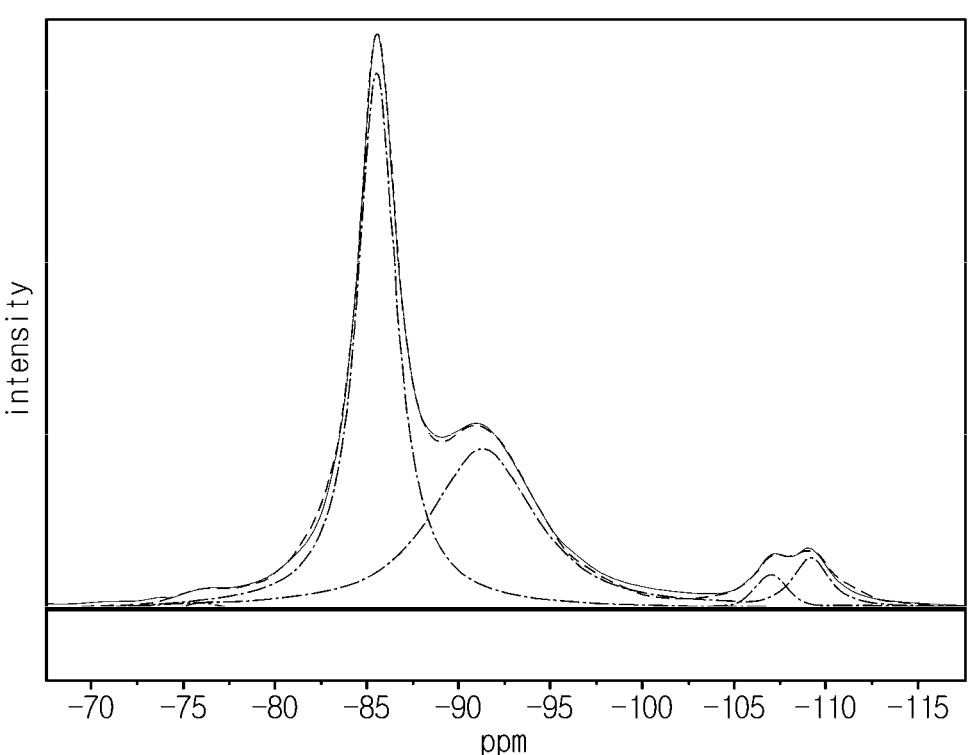

(2) The content of β-phase in each of the separators according to Example 1 and Comparative Example 1 is shown in the following Table 2 and FIG. 1 to FIG. 3. FIG. 1 is a graph illustrating the crystalline phase and amorphous phase of a PVDF film itself, and FIG. 2 and FIG. 3 are graphs illustrating the crystalline phase and amorphous phase of the separator according to Comparative Example 1 and those of the separator according to Example 1, respectively.

TABLE 2

| | Crystalline phase (%) | | | Amorphous |
| | α | β | α + β | phase (%) |
| --- | --- | --- | --- | --- |
| Comp. Ex. 1 | 8.7 | 27.4 | 36.1 | 63.9 |
| Ex. 1 | 0.6 | 39.2 | 39.8 | 60.2 |
| PVDF film itself | 29.8 | 13.5 | 43.3 | 56.7 |

As can be seen from Table 2, in the case of the PVDF film itself including a binder polymer alone without inorganic particles added thereto, α-phase is larger than β-phase. In the case of the PVDF film itself, F atoms having high electronegativity are located in the opposite direction and thus the film itself has significantly low polarity so that lithium ions may not be transported rapidly in the film. In addition, the PVDF film has pores having a significantly small size and the number of pores is small, and thus shows significantly high resistance.

The separator according to Example 1 has a content of β-phase of 39%. In other words, β-phase is 98% based on α-phase, and thus β-phase is significantly larger than α-phase. In this case, since the content of β-phase is high, F atoms having high electronegativity are arranged locally, resulting in significantly high polarity. In addition, lithium ion channels through which lithium ions can pass are formed in the separator, and thus the separator shows low resistance and provides a battery with improved output characteristics.

On the contrary, the separator according to Comparative Example 1 has an increased content of β-phase but β-phase is 68% based on α-phase. Thus, in this case, α-phase coexists with β-phase. Therefore, any local electric field through which lithium ions can pass is not formed in the separator so that resistance characteristics may not be improved. It is thought that the reason why Comparative Example 1 to which lithium halide is not added shows an increased content of β-phase is that inorganic particles having surface properties with relatively higher polarity are incorporated, and thus the crystal structure of PVDF is oriented in the direction with higher polarity. However, as compared to Example 1, the content of β-phase is not significantly high and any local electric field through which lithium ions can pass is not formed in the separator so that resistance characteristics may not be improved.

Herein, the test was carried out by using Agilent 600 NMR-MAS (magic angle spinning) probe. Particularly, a separator specimen was packed in a 1.6 mm NMR rotor and NMR data were analyzed at d1=30 s, ns=64-128 and MAS frequency of 35 kHz.

Figure 4:
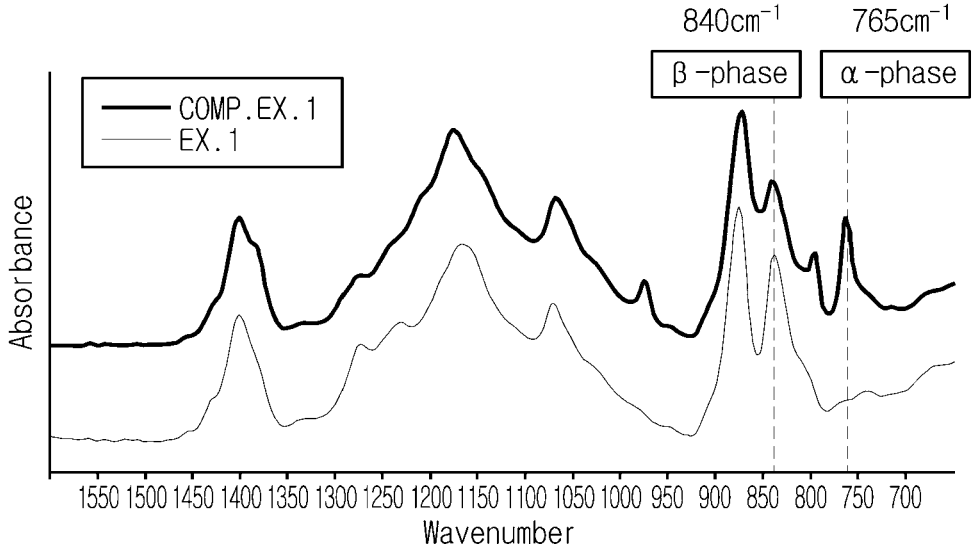
FIG. 4 illustrates the results of FT-IR spectrometry depending on addition of lithium halide in a binder solution.

(3) The following Table 3 and FIG. 4 illustrate the analysis results of variations in PVDF crystal structure depending on introduction of lithium halide into a binder polymer solution.

TABLE 3

| | | A(α) | A(β) | F(β) | F(α) | Avg. F(β) |
| --- | --- | --- | --- | --- | --- | --- |
| Coating | #1 | 0.057 | 0.056 | 0.45 | 0.55 | 0.50 |
| binder | #2 | 0.059 | 0.059 | 0.44 | 0.56 | |
| solution | #3 | 0.069 | 0.045 | 0.55 | 0.45 | |
| alone | #4 | 0.070 | 0.049 | 0.53 | 0.47 | |
| | #5 | 0.070 | 0.048 | 0.54 | 0.46 | |
| Coating | #1 | 0.067 | 0.003 | 0.95 | 0.05 | 0.95 |
| binder | #2 | 0.074 | 0.004 | 0.96 | 0.06 | |
| solution + | #3 | 0.077 | 0.003 | 0.95 | 0.05 | |
| LiCl | #4 | 0.070 | 0.002 | 0.96 | 0.04 | |
| | #5 | 0.059 | 0.002 | 0.96 | 0.04 | |

Herein, the value of Avg. F((β) was obtained by determining the spectrum of each sample five times with FT-IR spectroscopy in an ATR mode (diamond crystal) and calculating the average value of β-phase crystal structure ratios. In addition, F(β) was calculated according to the following Formula 1.\

$$F(\beta) = \frac{A_\beta}{(K_\beta/K_a)A_\alpha + A_\beta}$$ [Formula 1]

Absorption coefficient $$K(a) = 6.1 \times 10^4 \text{cm}^2 / \text{mol}$$

$$K(\beta) = 7.7 \times 10^4 \text{cm}^2 / \text{mol}$$

As can be seen from Table 3, when introducing lithium halide for the preparation of a binder solution, the content of β-phase of the polyvinylidene fluoride-based binder polymer in the resultant porous coating layer is increased by 50% or more based on the content of β-phase of the polyvinylidene fluoride-based binder polymer. As can be seen from FIG. 4, in the case of Example 1, the content of β-phase is maintained at a higher value based on the content of α-phase, thereby providing a separator showing low resistance. On the contrary, in the case of Comparative Example 1, the content of β-phase is not significantly higher based on the content of α-phase. Therefore, Comparative Example 1 cannot provide significantly reduced resistance, as compared to Example 1.

What is claimed is:

1. A method for manufacturing a free-standing separator, comprising:
   preparing a slurry including inorganic particles, lithium halide and a polyvinylidene fluoride-based binder polymer;
   applying the slurry to a release film, followed by drying, to form a porous separator layer;
   washing the porous separator layer after the drying with water; and
   removing the release film to form the free-standing separator,
   wherein a weight ratio of the inorganic particles to the polyvinylidene fluoride-based binder polymer is 90:10 to 60:40,
   wherein the lithium halide is removed by the washing, and
   wherein a content of β-phase of the polyvinylidene fluoride-based binder polymer in the porous separator layer after the drying is increased by 50% or more based on the content of β-phase of the polyvinylidene fluoride-based binder polymer in the slurry.

2. The method for manufacturing a free-standing separator according to claim 1, wherein the lithium halide comprises at least one selected from the group consisting of lithium fluoride (LiF), lithium chloride (LiCl), lithium bromide (LiBr), and lithium iodide (LiI).

3. The method for manufacturing a free-standing separator according to claim 1, wherein the slurry comprises 2-20 parts by weight of lithium halide based on 100 parts by weight of the polyvinylidene fluoride-based binder polymer.

4. The method for manufacturing a free-standing separator according to claim 1, wherein the polyvinylidene fluoride-based binder polymer comprises: a polyvinylidene fluoride-based homopolymer; a copolymer of polyvinylidene fluoride with any one of hexafluoropropylene (HFP), trifluoroethylene (TrFE), tetrafluoroethylene (TFE) or chlorotrifluoroethylene (CTFE); or two or more of them.

5. The method for manufacturing a free-standing separator according to claim 1, wherein the lithium halide comprises lithium fluoride (LiF).

6. The method for manufacturing a free-standing separator according to claim 1, wherein the lithium halide comprises lithium chloride (LiCl).

7. The method for manufacturing a free-standing separator according to claim 1, wherein the lithium halide comprises lithium bromide (LiBr).

8. The method for manufacturing a free-standing separator according to claim 1, wherein the slurry comprises 5-15 parts by weight of lithium halide based on 100 parts by weight of the polyvinylidene fluoride-based binder polymer.

9. A method for manufacturing a separator for an electrochemical device, comprising:
   preparing a slurry including inorganic particles, lithium halide and a polyvinylidene fluoride-based binder polymer;
   applying the slurry to at least one surface of a porous polymer substrate to form a slurry coated porous polymer substrate, followed by drying, to form the separator comprising a porous coating layer coated on the porous polymer substrate; and
   washing the porous separator layer after the drying with water,
   wherein a weight ratio of the inorganic particles to the polyvinylidene fluoride-based binder polymer is 90:10 to 60:40,
   wherein the slurry comprises 5-15 parts by weight of the lithium halide based on 100 parts by weight of the polyvinylidene fluoride-based binder polymer,
   wherein the lithium halide is removed by the washing, and
   wherein a content of β-phase of the polyvinylidene fluoride-based binder polymer in the porous coating layer after the drying is increased by 50% or more based on the content of β-phase of the polyvinylidene fluoride-based binder polymer in the slurry.

10. The method for manufacturing a separator for an electrochemical device according to claim 9, wherein the lithium halide comprises at least one selected from the group consisting of lithium fluoride (LiF), lithium chloride (LiCI), lithium bromide (LiBr), and lithium iodide (LiI).

11. The method for manufacturing a separator for an electrochemical device according to claim 9, wherein the polyvinylidene fluoride-based binder polymer comprises: a polyvinylidene fluoride-based homopolymer; a copolymer of polyvinylidene fluoride with any one of hexafluoropropylene (HFP), trifluoroethylene (TrFE), tetrafluoroethylene (TFE) or chlorotrifluoroethylene (CTFE); or two or more of them.

12. The method for manufacturing a separator for an electrochemical device according to claim 9, further comprising dipping the slurry coated porous polymer substrate in a non-solvent before the drying.

13. The method for manufacturing a separator for an electrochemical device according to claim 9, wherein the porous coating layer is formed at the same time when the lithium halide is removed.

* * * * *